April 8, 1924.

A. C. HENGST 1,489,939

COTTON SEED SEPARATOR

Filed Jan. 21, 1922

A. C. Hengst, INVENTOR.

BY Geo. P. Kimmel, ATTORNEY.

April 8, 1924.　　　　　A. C. HENGST　　　　　1,489,939

COTTON SEED SEPARATOR

Filed Jan. 21, 1922　　2 Sheets-Sheet 2

INVENTOR.
A. C. Hengst.
BY
Geo. P. Kimmel
ATTORNEY.

Patented Apr. 8, 1924.

1,489,939

UNITED STATES PATENT OFFICE.

AUGUST C. HENGST, OF SAN ANTONIO, TEXAS.

COTTONSEED SEPARATOR.

Application filed January 21, 1922. Serial No. 530,856.

*To all whom it may concern:*

Be it known that I, AUGUST C. HENGST, a citizen of the United States, residing at San Antonio, in the county of Bexar and State of Texas, have invented certain new and useful Improvements in Cottonseed Separators, of which the following is a specification.

This invention has reference to cotton seed separators and is designed to grade cotton seeds into various sizes, having distinctive qualities of which the number one quality may be selected for seed-cotton and a poorer quality may be also used for seed cotton or for feeding stock, while still another quality may be used for fertilizer after being suitably ground for the purpose.

In accordance with the invention there is provided a support or frame in which is mounted an elongated screen tapering from one end toward the other and provided with means whereby power may be applied to rotate the screen. Cotton is fed from a suitable container or receptacle wherein there is located an agitator, and from the receptacle a seed chute is provided, delivering into one end of the screen. For grading purposes the screen is formed with a plurality of meshes of wire fabric and at the discharge end of the screen there is provided a chute by means of which tailings are discharged from the machine.

The screen is made of conical form with the small end at the receiving portion and the large end opening into the tailing chute, and the screen is mounted on a shaft to which there is attached a belt pulley or other suitable means for applying power, not only to the screen but to the feeding agitator.

The invention will be best understood from a consideration of the following detailed description taken in connection with the accompanying drawings forming part of the specification with the understanding however, that the invention is not confined to any strict conformity with the showing of the drawings but may be changed and modified so long as such changes and modification mark no material departure from the salient features of the invention as expressed in the appended claim.

In the drawings, Figure 1 is a plan view, with some parts broken away, of a cotton seed separating or grading machine embodying the invention.

Figure 1:
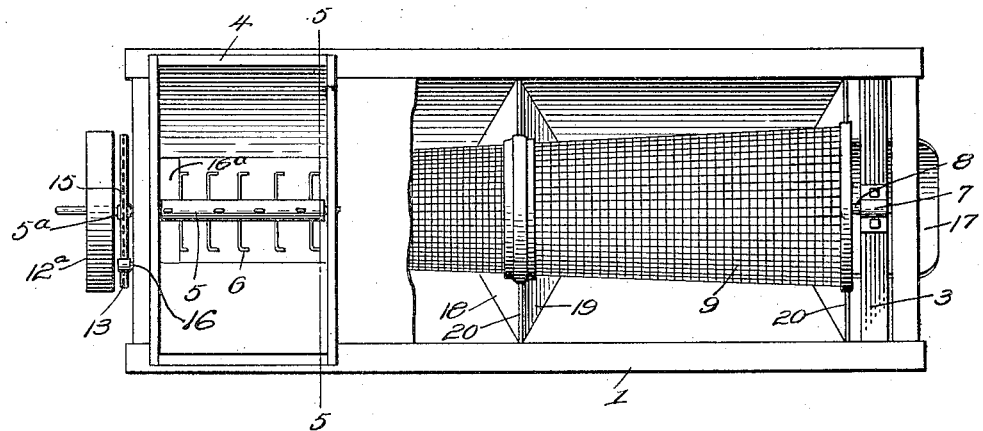
Figure 2:
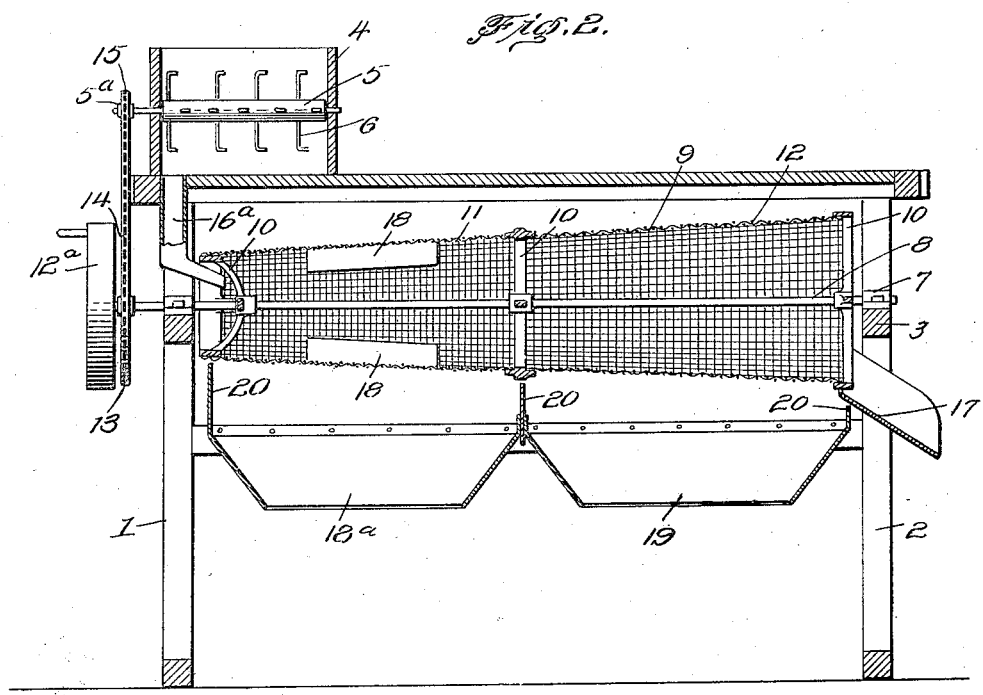
Fig. 2 is a vertical section of the machine of Fig. 1.
Figure 3:
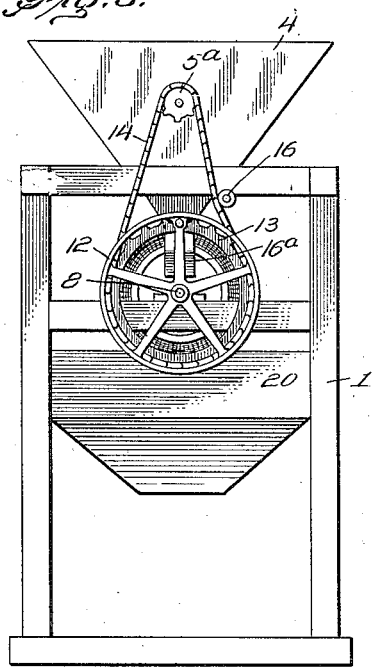
Fig. 3 is an end elevation of the receiving end of the machine.
Figure 4:
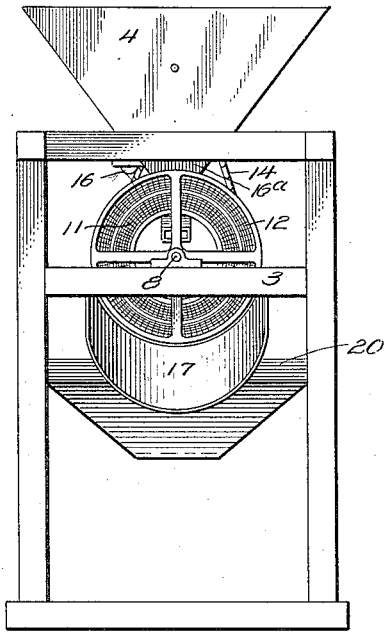
Fig. 4 is an end elevation of the discharge end of the machine.
Figure 5:
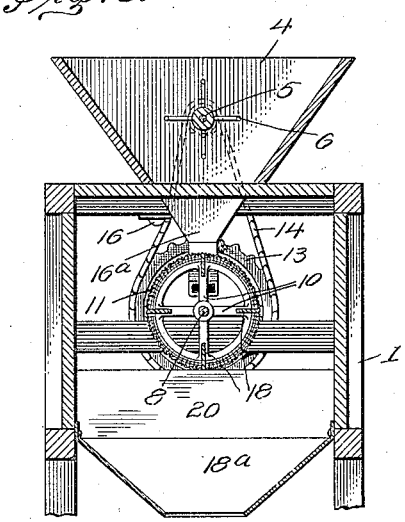
Fig. 5 is a section on the line 5—5 of Fig. 1.

Referring to the drawings there is shown a frame 1 made up of end uprights 2 and cross-beams 3 after the usual manner of constructing machines of the character of this invention.

At one end of the frame 1 there is mounted a hopper 4 traversed by a shaft 5 mounted at the ends in the hopper 4, and this shaft carries a series of pins 6 serving as agitating pins for a suitable mass of cotton seed or other material to be treated.

Mounted at the ends in suitable bearings 7 in the end posts of the frame 1 is a shaft 8 extending from one end to the other of the frame, and between the end posts 2 of the frame, carrying a tapering screen 9 supported by spiders 10 at suitable intervals. The screen 9 is formed of a suitable number of sections 11—12, or more if desired, with the mesh of the sections 11 and 12 corresponding to the size and gradation into which the cotton seed is to be separated.

The shaft 8 extends through one end of the frame 1, corresponding to the location of the hopper 4, and there the shaft 8 is provided with a pulley 12ª suitable for the application of a belt to drive the screen 9, but such belt is not shown in the drawings.

Mounted on the shaft 8 is a sprocket wheel 13 carrying a sprocket chain 14 in turn encircling a sprocket wheel 15 on the shaft 5, while a belt tightener 16 engages the sprocket chain 14 to maintain it in a suitably taut condition.

Leading from the hopper 4 is a seed duct 16ª in turn entering the smaller or receiving end of the screen 9 and depositing agitated seeds on the lower or inner surface of said screen 9.

At the other end or larger end of the screen 9 there is a downwardly inclined tailings chute 17 extending beyond the corresponding end of the machine to discharge the larger or coarser grade of separated seeds.

The spiders are sufficient in numbers to maintain the screen 9 in a spread or taut condition, and within the screen, in the section 11 thereof, are inwardly directed paddles 18 attached to the screen material by any suitable means, and serving as agitators for the seeds deposited in the receiving end of the screen by the spout 16.

The paddles 18 are spaced a considerable distance from the feed end of the screen, hence do not come in contact with the seed when first entering, as they would otherwise have a tendency to throw the seed from the smaller open end of the screen.

Carried by the frame 1 underneath the respective screen sections 11 and 12 are receiving hoppers 18ª and 19ª by which the graded seeds are conveyed to the floor or into suitable receptacles beneath the machine. The hoppers 18ª and 19ª are separated by an upright partition 20 whereby the seeds dropping from the different portions of the screen are prevented from becoming commingled.

I claim:—

A grading device of the class described comprising a supporting frame, a horizontal shaft mounted in said frame, a tubular screen diverging toward the discharge end and mounted to rotate with said shaft, the screen material toward the smaller intake end being of relatively fine mesh and the screen material toward the larger discharge end being of relatively coarse mesh, and a plurality of radially disposed paddles attached to the inner face of the finer mesh portion of the screen and spaced from the intake end of the screen.

In testimony whereof, I affix my signature hereto.

AUGUST C. HENGST.